United States Patent [19]

Barth et al.

[11] Patent Number: 5,263,161

[45] Date of Patent: Nov. 16, 1993

[54] NON-BUSY WAITING RESOURCE CONTROL

[75] Inventors: Paul S. Barth, Winchester; Richard M. Soley, Arlington; Kenneth M. Steele, Somerville, all of Mass.

[73] Assignee: Massachusetts Institute of Technology, Cambridge, Mass.

[21] Appl. No.: 897,590

[22] Filed: Jun. 11, 1992

Related U.S. Application Data

[63] Continuation of Ser. No. 385,733, Jul. 26, 1989, abandoned.

[51] Int. Cl.⁵ .............................................. G06F 9/46
[52] U.S. Cl. ............................... 395/650; 364/DIG. 1; 364/228.1; 364/246.8
[58] Field of Search ........................................ 395/650

[56] References Cited

U.S. PATENT DOCUMENTS

| | | | |
|---|---|---|---|
| 3,683,418 | 8/1972 | Martin | 444/1 |
| 4,249,241 | 2/1981 | Aberle et al. | 364/200 |
| 4,604,694 | 8/1986 | Hough | 364/200 |
| 4,663,709 | 5/1987 | Fujiwara et al. | 364/200 |

OTHER PUBLICATIONS

A. W. Bidwell et al., "Shared storage locking facility", IBM Technical Disclosure Bulletin, vol. 14, No. 5, Oct. 1971, pp. 1543-1544.

J.-K. Peir et al., "Data flow execution of fortran loops", Proceedings of First International Conference on Supercomputing Systems, St. Petersburg, Fla., US Dec. 16-20 1985, IEEE Computer Society, pp. 129-138.

K. Kawakami, et al., "A scalable dataflow structure store", Conference Proceedings of the 13th Annual International Symposium on Computer Architecture, Tokyo, Japan, Jun. 2-5 1986, IEEE, pp. 243-250.

K. Hiraki et al., "System Architecture of a dataflow supercomputer", Proceedings Tencon 87, 1987 IEEE region 10 Conference, Computers and Communications Technology Toward 2000, vol. 3 of 3, Seoul, Korea, Aug. 25-28 1987, IEEE, pp. 1044-1049.

Jayaraman, B. and Keller, R., "Primitives for Resource Management in a Demand Driven Reduction Model", *Int'l of Parallel Prog.*, vol. 15, No. 3, (1987), 215-244.

Gait, J., "Synchronizing Multiprocessor Access to Shared Operating System Data Structures", *Comp. Sys. Sci. and Eng.*, vol. 2, No. 4, (Oct. 1987), 186-191.

Hac, A., "Modelling Parallel Access to Shared Resources in a Distributed File System Using Queueing Networks", *J. of Systems and Software*, vol. 1, No. 2, (1986), 61-69.

Frederickson, P., Jones, R. and Smith, B., "Synchronization and Control of Parallel Algorithms", *Parallel Computing*, vol. 2, (1985) 255-264.

Vidyasankar, K. and Raghavan, V., "Highly Flexible Integration to the Locking and the Optimistic Approaches of Concurrency Control", *Proc. of COMPSAC'1985*, (1985), 489-494.

Dijkstra, E. W., "Co-operating Sequential Processes", in Genuys, ed., *Programming Languages*, (1968), 43-112.

*Primary Examiner*—Gareth D. Shaw
*Assistant Examiner*—A. Katbab
*Attorney, Agent, or Firm*—Hamilton, Brook, Smith & Reynolds

[57] ABSTRACT

A data structure has a value field for storing values and a lock field for indicating a lock state of the resource associated with the data structure. This data structure is used to implement a locking protocol amongst multiple processes competing for shared resources. If the lock field is a locked state, the process that locked the lock field has exclusive access to the resource. If, however, the lock field is in an unlocked state, any process may gain access to the resource. The lock field also has deferred states corresponding to the locked and unlocked states wherein multiple requests to lock or unlock the resource may be stored until serviced. The locking protocol is useful in a data processing system having multiple processing elements and utilizes a locking means that includes a local memory controller.

26 Claims, 6 Drawing Sheets

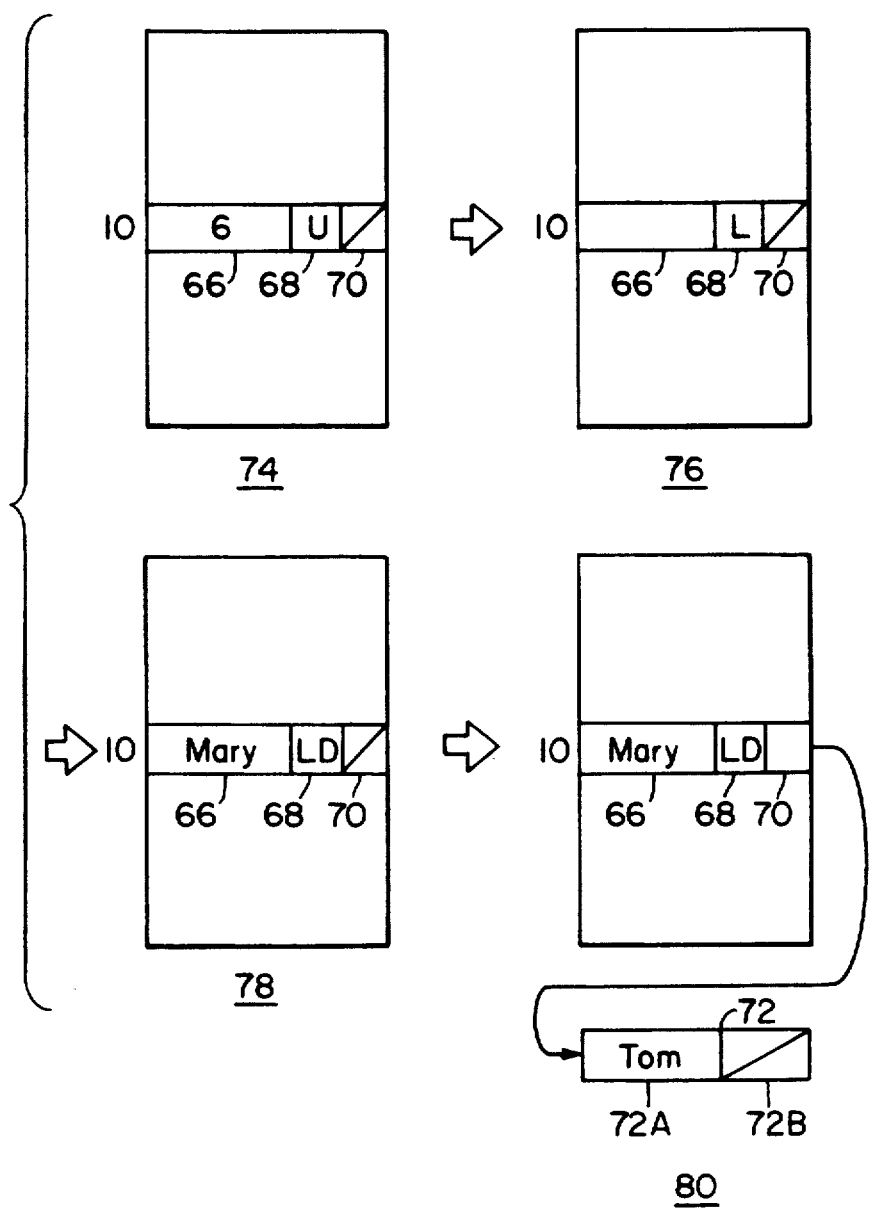

NON-BUSY WAITING RESOURCE CONTROL

The Government has rights in this invention pursuant to contract Number N00014-84-K-0099 awarded by the Department of the Navy.

This is a continuation of copending application Ser. No. 07/385,733 field on Jul. 26, 1989, now abandoned.

BACKGROUND OF THE INVENTION

Data processing systems that concurrently perform multiple processes must have a means for synchronizing access to common resources that are shared by the multiple processes. Typically, data processing systems have provided such synchronized access to the shared resources by employing busy-waiting strategies. In busy-waiting, each process makes a request for a resource and waits idly until the resource is available. When the resource eventually becomes available, an idle process gains access to the resource. This approach provides adequate synchronization, but suffers the drawback that the processor must idle while waiting on the resource. One such busy-waiting approach that utilizes a software semaphore mechanism to bring about synchronization was proposed by E. W. Dijkstra in "Co-operating Sequential Processes", in Genuys, ed. *Programming Languages*, N.A.T.O. 1968. In particular, the proposed approach utilizes a busy-waiting locking semaphore to synchronize multiple processes' access to shared resources.

SUMMARY OF INVENTION

The present invention includes a data structure for implementing a locking protocol. This locking protocol provides synchronization of access to a data processing resource by multiple processes. The data structure has a single memory address which includes a value field for holding values and a lock field for indicating the lock state of the value field at the memory address. When this lock field indicates that the value field is locked, no process other than the process that locked the value field may gain access to the value field. When unlocked, any process may gain access to the resource.

In accordance with one embodiment of the present invention, the value field may hold data or, alternatively, it may hold a pointer to a deferred list of look or unlock requests. These two kinds of values share the use of the value field to optimize efficiency. They can share the same value field because they will never be stored in the value field at the same time. The nature of the two values makes them inherently mutually exclusive. In accordance with another embodiment of the present invention, the pointer does not share the value field with data; rather, it is stored in a separate field that is distinct from the value field.

When the lock field is in a locked and deferred state, it preferably is an indicator that a process currently has exclusive access to the value field and that multiple requests for exclusive access to the value field are pending. The pending multiple requests may be stored on a deferred list that is pointed to by the pointer. Similarly, when the lock field is in an unlocked and deferred state, it is preferably an indication that no process currently has exclusive access to the data field, but that multiple requests to unlock the value field are pending. The pending unlock request may be stored on a deferred list that is pointed to by the pointer.

If the look field is in a locked state, an unlock request changes the lock field to an unlocked state. In converse, if the lock is in an unlocked state, a lock request changes the lock field to a locked state. The locking scheme of the present invention, however, is not limited to such basic states for other possibilities exist. For instance, if the look field is in a locked state and a lock request is received, the state of the lock field is changed to a locked and deferred state. The lock request is added on to the deferred list. Likewise, if an unlock request is received while the lock field is in an unlocked state, the state of the lock field is changed to an unlocked and deferred state and the unlock request is added to the deferred list.

Once in these deferred states, the lock field will stay in the deferred states until the deferred requests have been serviced. In particular, if the lock field is in a locked and deferred state and a look request is received, the lock field stays in that state. Analogously, if the lock field is in an unlocked and deferred state and an unlock request is received, the lock field stays in the unlocked and deferred state. In either of these cases, the respective requests are added on to the deferred list.

Moreover, the lock field will stay in its current state when the lock field is currently in a locked and deferred state and an unlock request is received if multiple lock requests are on the deferred list. A look request, however, is popped off the deferred list in response to the unlock request. A similar situation exists when the look field is currently in an unlocked and deferred state and a lock request is received. The look state remains in the unlocked and deferred state, nevertheless, an unlock request is popped off the deferred list.

Only when the last request on a deferred list is popped off the deferred list does the lock field change states. Specifically, if the lock field is in a locked and deferred state and the last lock request is popped off the deferred list by an unlock request the lock field changes to a locked state. Furthermore, if the lock field is in an unlocked and deferred state and the last unlock request is popped off the deferred list by a lock request, the lock field changes to an unlocked state.

The above scheme may be used to share memory locations and I-structures. The present invention uses a memory location looking means for implementing the above locking scheme of shared memory locations. The memory location looking means has a process indicator comprised of a frame pointer and instruction pointer preferably held in a register. The frame pointer points to a memory location to be accessed in the memory and the instruction pointer indicates an instruction to be performed at that location. Each memory location includes the above-mentioned lock state. The operation of the locking scheme is overseen by a local controller. The local controller looks to the instruction pointed to by the instruction pointer, to the contents of the location pointed to by the frame pointer and to the associated lock state to determine what is to be done in response to the instruction.

This looking scheme may be used in a data processing system such as a dataflow processing system. Such a data processing system has a plurality of processes, a memory such as described above and a controller as described above. The system is designed such that a request for memory access may be made by a processing element, and it may perform other tasks while waiting for the memory access to be performed.

BRIEF DESCRIPTION OF THE DRAWINGS

FIGS. 6a and 6b illustrate a sequence of read/lock tokens and the effect of their execution on a memory location.

DETAILED DESCRIPTION OF THE PREFERRED EMBODIMENT

The preferred embodiment of the present invention concerns a data flow processing system 2 having locking memory locations. The data flow processing system is comprised of a plurality of processing elements 5 that share numerous memory units 10. These processing elements 5 perform multiple processes in parallel. The processes performed include operations that require access to the memory units 10. Given that such operations are performed in parallel, problems with the multiple processes seeking access to the same memory unit location may arise. To avoid potential conflict between competing processes, individual processes are granted access to single memory locations for limited periods of time. Specifically the memory locations are not modified until a processing element is finished using the memory location.

This capability is provided by the use of a locking mechanism. All processing elements 5 other than the processing element that has locked the memory location are prevented from accessing the memory location until the memory location has been unlocked. The processes, however, are not required to remain idle while waiting for the memory location to be unlocked. They continue processing other tasks while waiting.

Figure 1:
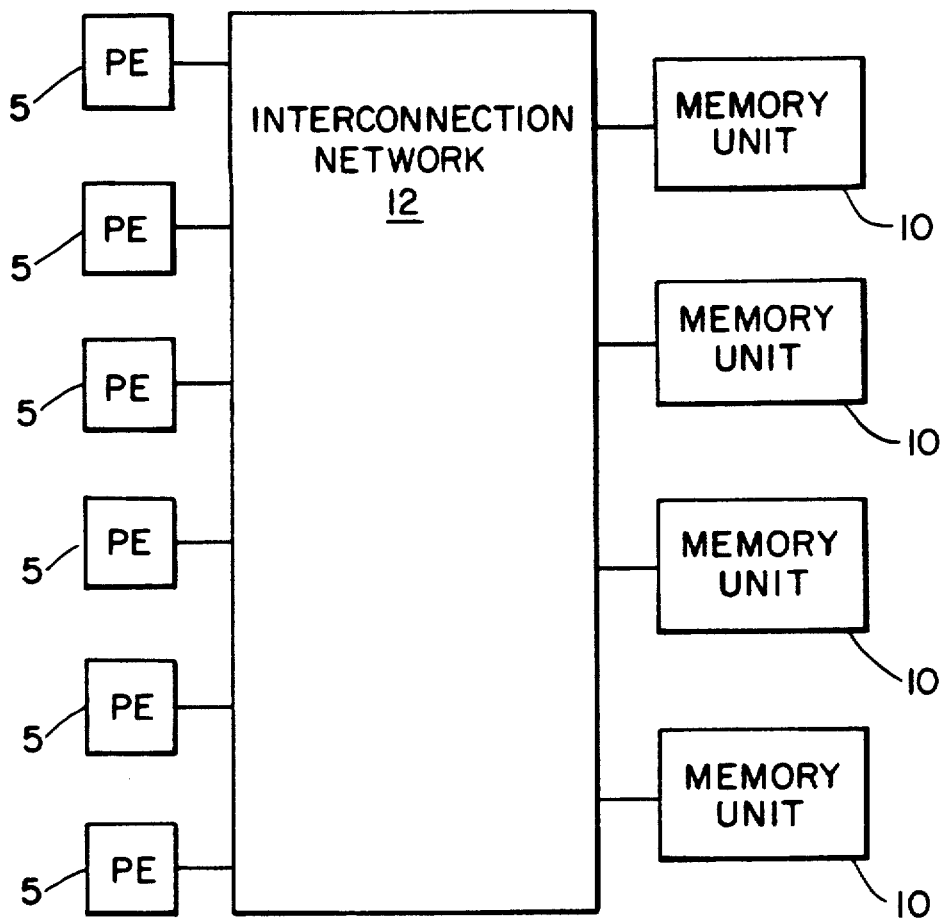
FIG. 1 illustrates the major components of the data processing system.

FIG. 1 shows the major components of the data flow processing system 2. Specifically, the system 2 includes a plurality of processing elements 5 and a plurality of memory units 10. Communication between the memory units 10 and the processing elements 5 is achieved via an interconnection network 12. The interconnection network 12 is comprised of circuitry well known in the prior art. Each of the processing elements 5 has access to each of the memory units 10. These processing elements 5 are preferably pipelined so as to maximize the parallel activity within each processing element 5. A preferred, processing element configuration is presented in G. Papadopoulos, "Implementation of a General Purpose Dataflow Multiprocessor", Doctoral Thesis, Massachusetts Institute of Technology, 1988.

Figure 2:
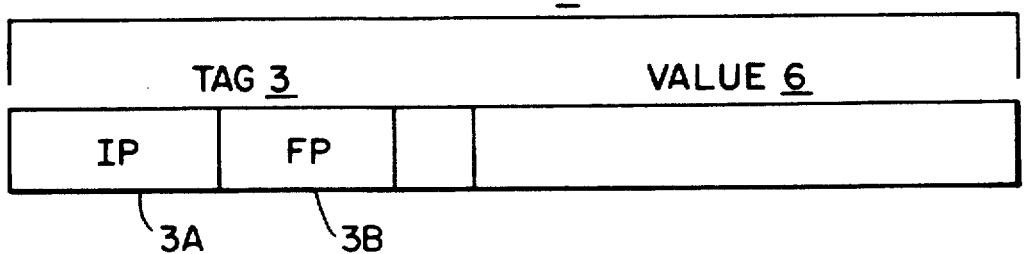
FIG. 2 illustrates the fields included within a token.

The data flow processing system 2 is preferably a tagged token- data flow processing system that operates upon tokens. As FIG. 2 illustrates these tokens 11 are comprised of a tag field 3 and a value field 6. The tag field 3 is used to hold an instruction pointer 3a designated as IP in FIG. 2 and to hold a frame pointer 3b designated as FP in FIG. 2. The instruction pointer 3a points to an instruction to be performed. The frame pointer 3b, in contrast, points to the beginning of a frame of memory locations, one of which is accessed by the instruction. The value field 6 is used for a purpose. It is used to store a value. The significance of the value held in the value field 6 varies and depends upon the instruction to which the instruction pointer 3a points. For instance, the value may represent an address or simply a current data value.

Each processing element 5 maintains a local token queue in which it stores a plurality of tokens. Each processing element 5 clocks a new token from the token queue into the pipeline of the processing element 5 every clock cycle of a system clock. Within the pipeline of the processing element 5, execution is attempted of the instruction pointed by the instruction pointer 3a of the tag portion 3 of the token 11. Often, however, to complete execution of the instruction it is necessary to access memory. In such a case, the pipeline of the processing element 5 generates a new token, the tag of which indicates a reading operation or a writing operation to be performed at the memory location that needs to be accessed. These tokens exit the pipeline and travel across the interconnection network 12 to the memory units 10 where the memory access requests are serviced. How such memory access requests are handled and the memory mechanisms for efficiently servicing such requests are of great concern to the preferred embodiment present invention.

Figure 3:
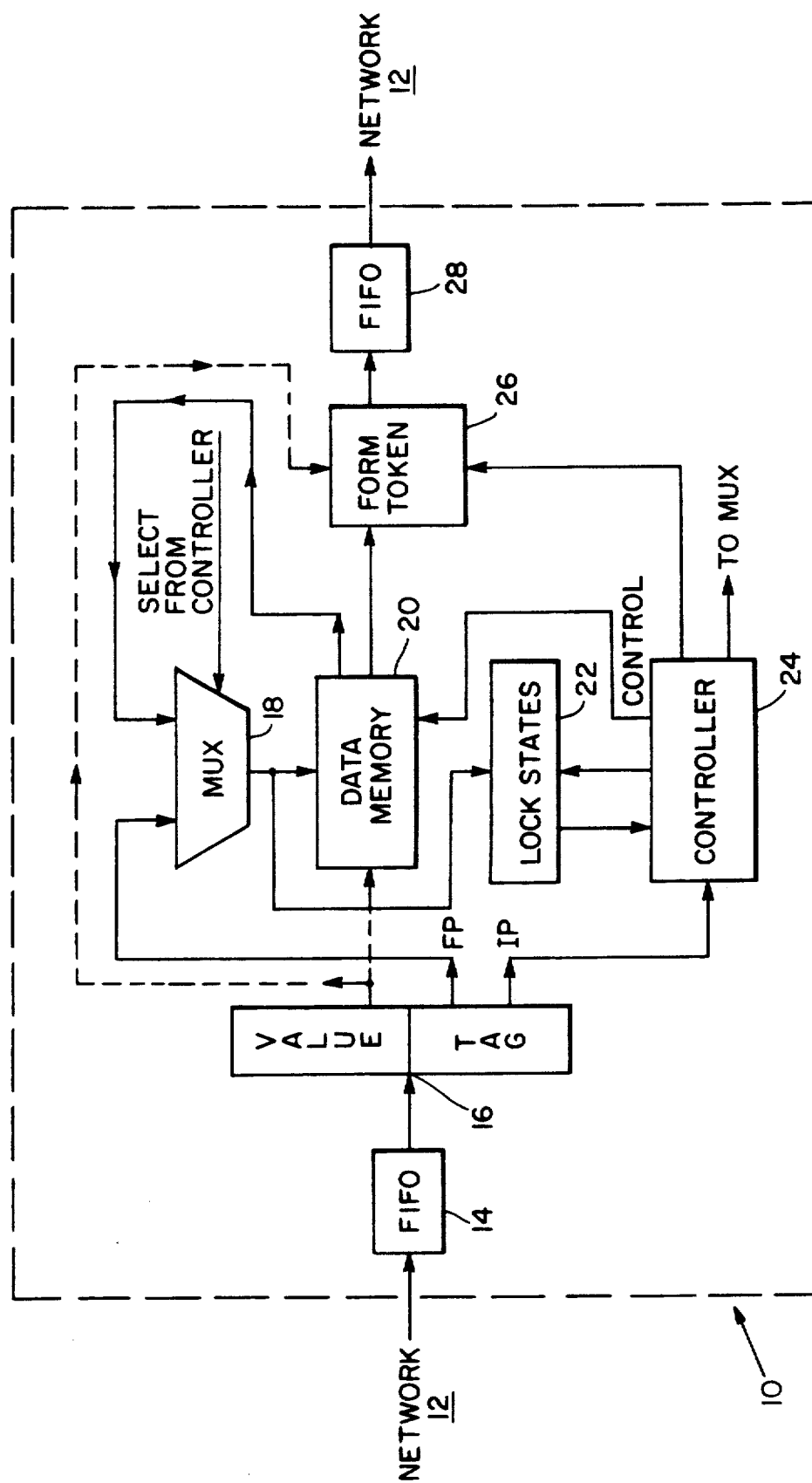
FIG. 3 illustrates a memory unit in detail.

FIG. 3 shows a memory unit 10 with locking capability in more detail than FIG. 1. The memory unit 10 includes a first FIFO 14 for buffering incoming tokens sent from the processing elements 5 seeking access to memory. The tokens after being stored in the first FIFO buffer 14 are sent one at a time to a register 16. The register 16 is in communication with a multiplexer 18, a data memory 20 and a controller 24. In addition, a token forming buffer 26 is provided to assist in generation of output tokens. The output tokens are delivered to a second FIFO buffer 28 and subsequently delivered from there to the network 12.

In typical operation, the memory unit 10 receives tokens 11 seeking access to memory from a processing element 5 via the network 12. These tokens are temporarily stored in the first FIFO buffer 14. When the register 16 is ready to receive a new token from the first FIFO buffer 14 a token is transferred out of the first FIFO buffer 14 to the register 16. As processing continues, the frame pointer value 3b is taken from the token held in register 16 and passed on to a multiplexer 18. The frame pointer points to the specific memory location to be accessed. The instruction pointer value 3a is also forwarded but to the controller 24. The instruction pointer tells the controller 24 what operation is to be performed at the memory location specified by the frame pointer.

Once the controller 24 determines the operation to be performed, it sends an appropriate select signal to the multiplexer 18 to select the memory address to be accessed. The address may be the address indicated by the frame pointer 3b or an address found in a memory location of data memory 20. If the address is selected to be one found in the memory location of data memory, it is a deferred list address. Deferred lists will be discussed in more detail below. The address selected by the multiplexer 18 travels to the address line of data memory 20 and to the address lines of the lock state memory 22 where the address is used to gain access to the respective memory locations. The controller 24 examines the lock state associated with the addressed location and acts accordingly.

As is apparent from the suggested configuration, the look states and data values of a memory address need not be stored at the same physical memory location. In fact, they may be stored, at separate physical locations, but they must be addressable by a single memory address so that when an address is accessed both the data and lock states are available. It is desireable to physically divide the memory so that memory access time for the lock state information may be optimized. Specifically, it is preferred that a static high speed memory be used to store the lock state memory 22 because of the large number of accesses to the lock states generally required. Typically, a lock state must be read and a new lock state written for each locking instruction performed. Using a station memory minimizes the time spent on these transactions. A static memory, however, is not desirable for the data memory 20 because it entails too great of an expense. Moreover, the need for such a static memory for with data is not as great as it is with the lock states since the data is not accessed as frequently as the lock states. Hence, a dynamic memory should be used for data memory 20.

Read and write instructions in the preferred embodiment are not simply standard read and write instructions. Rather they are hybrid instructions that perform dual functions. Specifically, read instructions in addition to performing a standard read lock the memory locations that are read, and write instructions unlock the memory locations which are written. These are the only lock control instructions that are required to implement preferred embodiment. Standard read and write instructions are available within the data flow processing system 2 but are only used at portions of the memory which are not capable of being locked and unlocked. It is preferable to have portions of the memory that may not be locked and may not be unlocked because there is an overhead associated with maintaining locks and unlocks. Since it is not necessary to have locks and unlocks at every memory location, it is possible to eliminate this unnecessary overhead by having non-locking locations as well as locking locations. For the remainder of the discussion it can be assumed that all reads and all writes refer to read/lock instructions and write/ unlock instructions, respectively.

Figure 4:
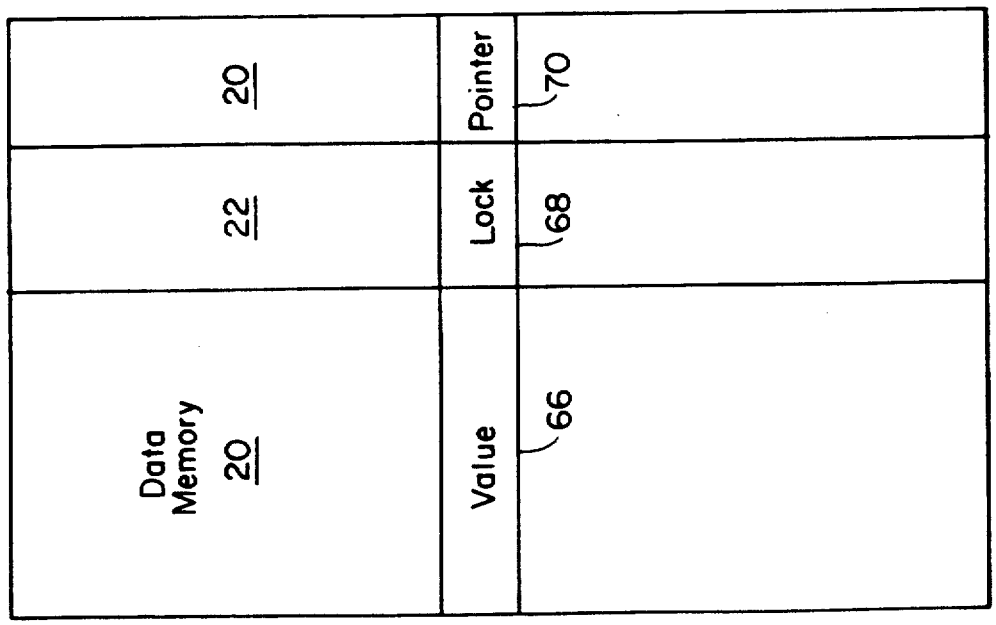
FIG. 4 illustrates an addressable memory location.

FIG. 4 depicts a typical memory location. This memory location may be comprised of three fields. Two of these fields 66 and 70 are physically located in data memory 20, whereas the other field 68 is physically located in the lock state memory 22. The first field is the value field 66 which is used for storing values such as data and addresses as described previously. The lock field 68 is used for storing the current lock state of the memory address. Lastly, the pointer field 70 is provided to store pointers to elements of a deferred list if necessary. In the alternative, a pointer field 70 need not be used; rather, the value field 66 can be used as the functional equivalent of both the value field 66 and the pointer field 70. In particular, when this option is employed, the value field 66 stores either data or a pointer, since both never reside in a memory location at the same time, it may be more efficient to have both stored in a single field. The present invention does not choose one of these alternatives but instead encompasses both alternatives.

Suppose that a token carrying a write/unlock request enters the memory unit 10 and the memory location into be written to is in a locked state. As the token is processed, the controller 24 gains access to the memory location specified on the address lines of the data memory 20 as was noted above. The controller then causes the value held in the value field 6 of the token 11 in the register 16 to be written into the accessed memory location.

Suppose, however, that the token carries instead a request for a read/look instruction to be performed and the memory location is in an unlocked state. In that case, the controller 24 uses the address on the address lines of the data memory 20 to access a memory location within data memory 20. Once the controller 24 gains access to the memory location, it reads the contents of the memory location. The contents are then forwarded to the token forming buffer 26. In such a case, the value field of the incoming token 11 is passed to the token forming buffer 26 as a destination address for the read value. This destination address is placed in the frame pointer field of the output token at the token forming buffer 26. It identifies a processing element and a frame of memory local to the processing element. In addition, the instruction pointer for the output token is forwarded by the controller 24, and the value is forwarded from data memory 20 as dictated by the controller 24. The output token is next forwarded to the second FIFO buffer 28. This buffer is provided in order to allow for a backlog of output tokens so as to prevent swamping of the network 12. The output tokens held in the second buffer 28 are forwarded to the network 12 when the network 12 is ready to receive them.

If a read/lock is sought and the memory location to be read is in a locked and deferred state (this state will be discussed in more detail later), the system responds differently to the token than if the memory location were in an unlocked state. First, when the memory location is in such a locked and deferred state, output tokens are formed only when the appropriate data arrives via an write/unlock request. Second, the destination address is not taken from the value field of the register 16, rather it is taken from an element on the deferred list held in data memory corresponding to the read/lock request. The organization of deferred lists will be described below in an example. The other fields of the output token are, still, formed as previously described.

Figure 5:
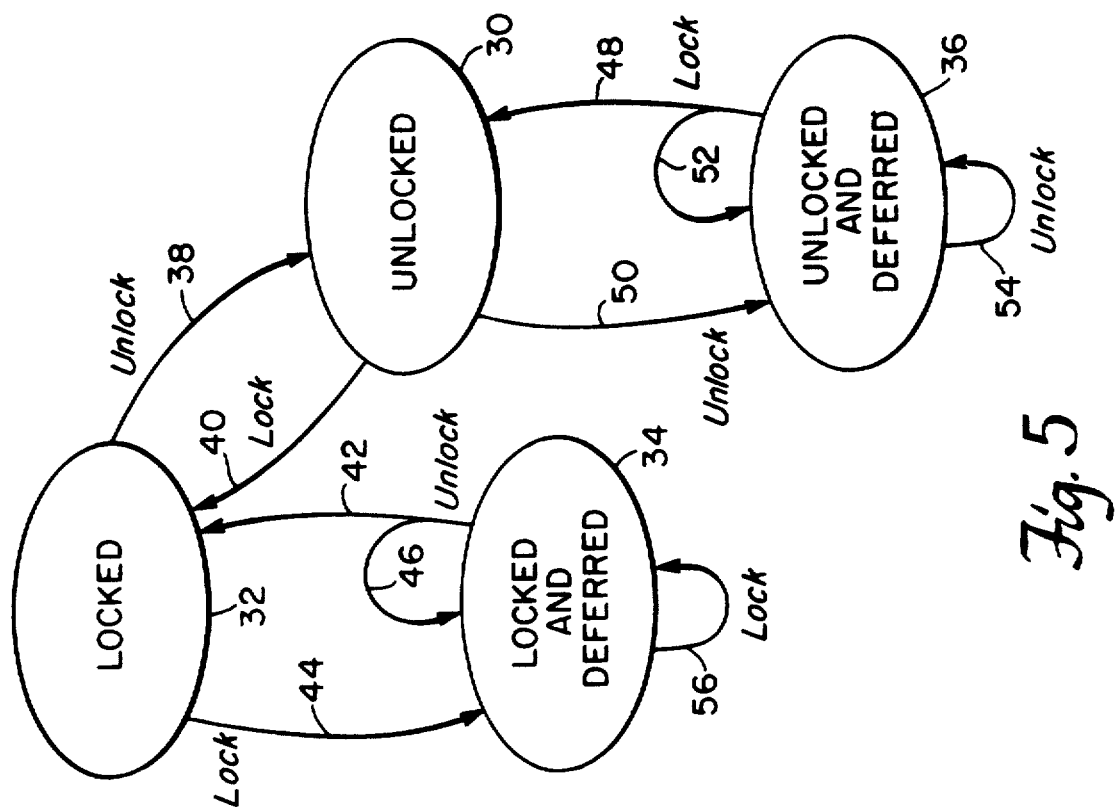
FIG. 5 illustrates a state diagram of the basic locking scheme.

It should be bore in mind that the non-locking locations contain the same bits that comprise the lock field at locking locations. These bits however, have a different significance in the non-locking locations. In locking locations the bits represent the different lock states. The three basic states which the lock field of a memory location may assume are shown in FIG. 5. The three states are unlocked 30, locked 32 and locked and deferred 34. All memory locations that are capable of being locked are initially in an unlocked state 30. If a lock read/lock request 40 is made to a memory location, the lock field of the memory location is changed to a locked state 32. If a write/unlock request 38 subsequently arrives to the same memory location, the lock field of the memory location is changed back to an unlocked state 30.

If the location is in a locked state and a read/look request 44 arrives, it changes the state field to a locked and deferred state 34. Any additional read/lock requests 56 received while the state field is in this locked and deferred state 34 do not alter the state. These requests, nevertheless, are stored in a deferred list. Write- /unlock requests 46 received while the state field is in a locked and deferred state 34 act to remove a single corresponding read/lock request from the deferred list. The final such write/unlock request 42 removes the last deferred read/lock request and returns the state field to a locked state 32. The order of requests in this example need not be followed. Requests for write/unlocks and read/locks may occur in any order. The order described above was chosen merely for illustrative purposes.

The significance of the locked state and the locked and deferred state is that no other processing elements 5 other than the processing element to which the read/lock is granted may access the memory location while locked. The other processing elements 5 must wait until that location is unlocked before they can gain access to it. A useful analogy is to view the memory location as a library book. When a person seeks to check out the library book it is the equivalent of a read/lock instruction. The person checking out the book has exclusive access to the book. He may modify the book and given that only one book is available, he may then replace the modified book such that all subsequent persons receive the book as modified by him. Any persons seeking to check out the book while it is gone may not obtain the book but may, however, request that their name be written down on a list of persons seeking the book.

This list is analogous to the deferred list in the locked and deferred state. When the person who originally checked out the book returns the book, it is as if he submits a write/unlock request. The book is still in a locked and deferred state because there are still names on the list. However, the first person on the list receives the book and is struck from the list. This process is repeated with every subsequent returning of the book until the last person on the list gains possession of the book at which time the book is merely in a locked state. If this person returns the book the state returns to an unlocked state.

The above description describes the basic states needed to implement a locking strategy in accordance with an embodiment of the present invention. These states may, however, be embellished upon to produce a more powerful locking strategy that has an additional state: unlocked and deferred. The state diagram that is produced when this state is added to the previous state diagram is shown in FIG. 5. The additional state provides the present invention's locking strategy with a queueing capability.

To assist in understanding the unlocked and deferred state 36, suppose, that the memory location is initially in an unlocked state and that a write/unlock request 50 is received. The lock field of the memory address is changed to an unlocked and deferred state 36. While in this unlocked and deferred state 36, any subsequently received write/unlock requests 54 have no effect on the state held in the look field; however, the requests are put into a deferred list. This list is implemented using the same hardware that is used in the locked and deferred list. Since both lists cannot exist at the same time, the sharing of hardware for both lists offers an efficient strategy that minimizes overhead costs.

Read/lock requests 52 received while there are still write/unlock requests on the deferred list cause 54 write/unlock requests to be popped off the list. The requests on the deferred list are popped off one at a time such that each write/unlock request is popped off the list only in response to an associated read/lock request. The write/unlock request that is popped off need not be located at the head of the list. It can be located elsewhere in the list without imposing large overhead costs. Eventually, as processing continues, the deferred list is reduced to a single write/unlock request. This final write/unlock request on the deferred list, like its predecessors, is popped off the list by read/look request 48. When it is popped off, the state field of the memory locator is changed back to an unlocked state 30. This strategy assures that all deferred write/unlock requests are handled before the state field is returned to an unlocked state 30.

FIGS. 6a and 6b illustrate a sequence of tokens and the corresponding effects of executing these tokens. In particular, FIG. 6a illustrates tokens 60, 62, and 64 which are executed in sequential order. Suppose initially that the value field 66 of the memory location has a value of six and that the state field 68 has a value of an unlocked state indicated as "U" in the memory state 74 of FIG. 6b.

When token 60 is executed, the memory location contents at address 10 change to a memory state 76. In particular, the value six is read out of the value field 66. The value field 66 enters a don't care condition. The state field 68 is changed to indicate that the memory location is now locked (denoted by a "L"). The value six is sent to the address Joe via a new token. Joe is a name given a frame pointer value of the return address for illustrative purposes.

When token 62 is executed, the memory location contents at address 10 change to memory state 78. Instead of storing a piece of data in the value field 66, the return address Mary is stored in the value field 66. Mary like Joe is merely a name given to the return address for illustrative purposes. Furthermore, the state field 68 is changed from a locked state to a deferred and locked state (denoted as "LD"). At this time, no new token is generated to return the data to its destination. When the data becomes available, a new token is generated to carry the data to its destination. If a write/unlock request is received for address 10, the memory controller 24 knows that a pending look (read/lock) request seeking to return a read value to a location Mary is outstanding.

When the last token 64 is executed, location 10 is already in a deferred and locked state. The value field 66 and the state field 68 are not changed. Rather, the only change that occurs is that pointer field 70 which was previously "nil" is changed so that it points to a read/lock request 72. This lock request stores the return address of the request at 72a, which is Tom in this case. It also stores a pointer 72b to the next request on the deferred list. In this case, there are no more requests; hence, no value is stored in the pointer.

Figures 7A, 7B:
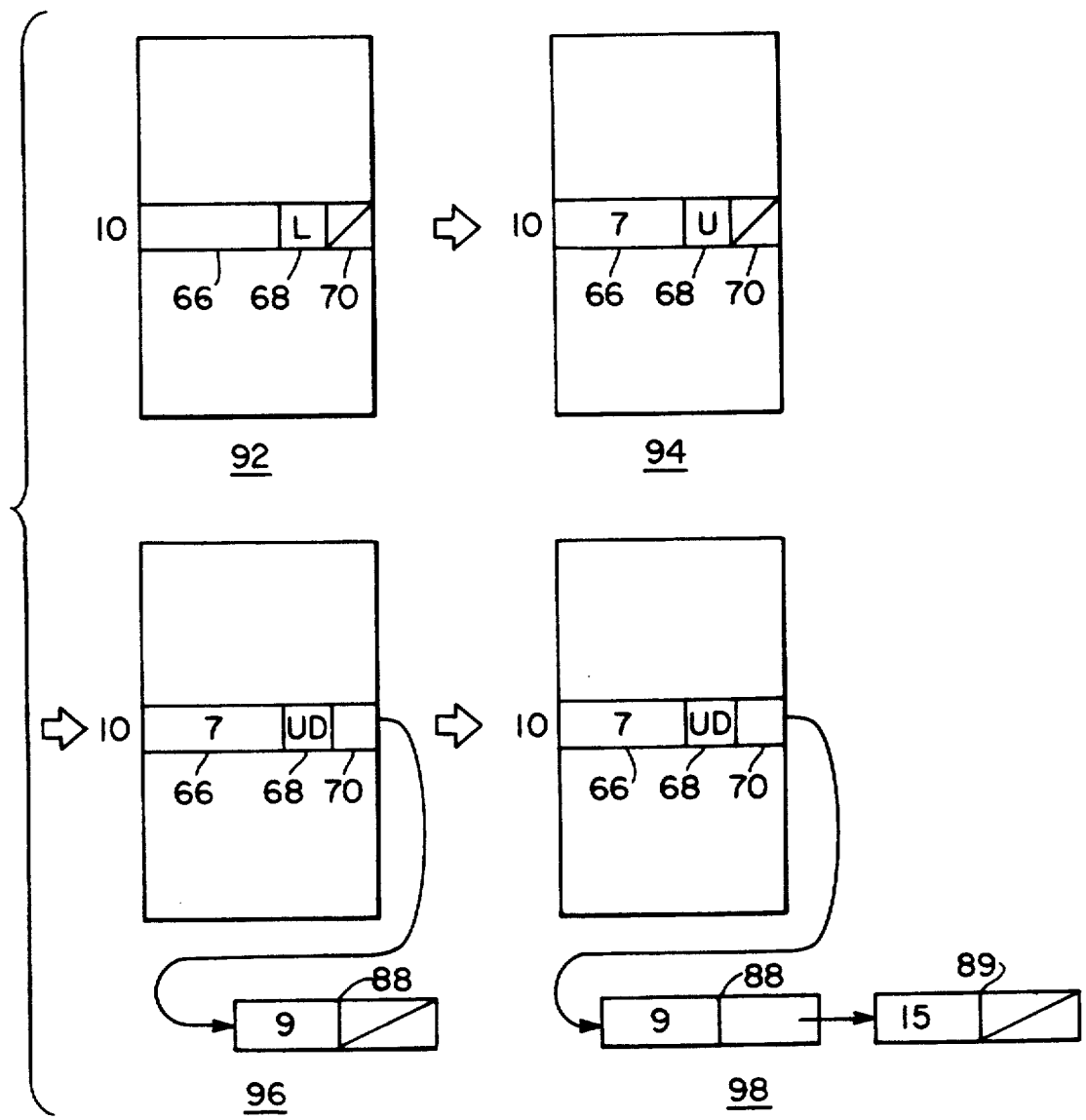
FIG. 7a and 7b illustrate a sequence of write/unlock tokens and the effect of their execution on a memory location.

FIGS. 7a and 7b show a sequence of write/unlock tokens and the resulting memory state produced by executing these tokens 82, 84, and 86. Suppose that the memory location contents at address 10 start off in a memory state 92 where the value field 66 has a don't care value. Further, the lock field 68 is in a locked state and the pointer field 70 is in a nil state. When the token 82 is executed, the memory location 10 contents change to memory state 94. In this memory state, the value field 66 has a value of seven and the lock field 68 has a value of unlocked. The pointer field 70 remains in a nil state. No new token is generated.

When token 84 is executed, the memory location contents 10 change into memory state 96. The value field 66 remains as it did in memory state 94. Specifically it still stores a value of seven. The lock field, however, is changed to an unlocked and deferred state. Furthermore, the pointer field 70 now points to an unlock request 88. This unlock (write/unlock) request 88 contains a value to be written by the request. In this case, the value is nine and contains a pointer to the next request in the deferred list. Since there are no other requests in this example case, the pointer has a value of nil.

The execution of token 86 does not alter the contents of memory location 10, rather, it merely adds another unlocked request to the deferred list. Specifically, request 88 changes its pointer value, to point to an additional unlock request 89. This unlock request 89 includes the value sought to be written (i.e. fifteen), and a pointer. The pointer has a nil value for the request 89 is the last request on the deferred list.

Figure 8:
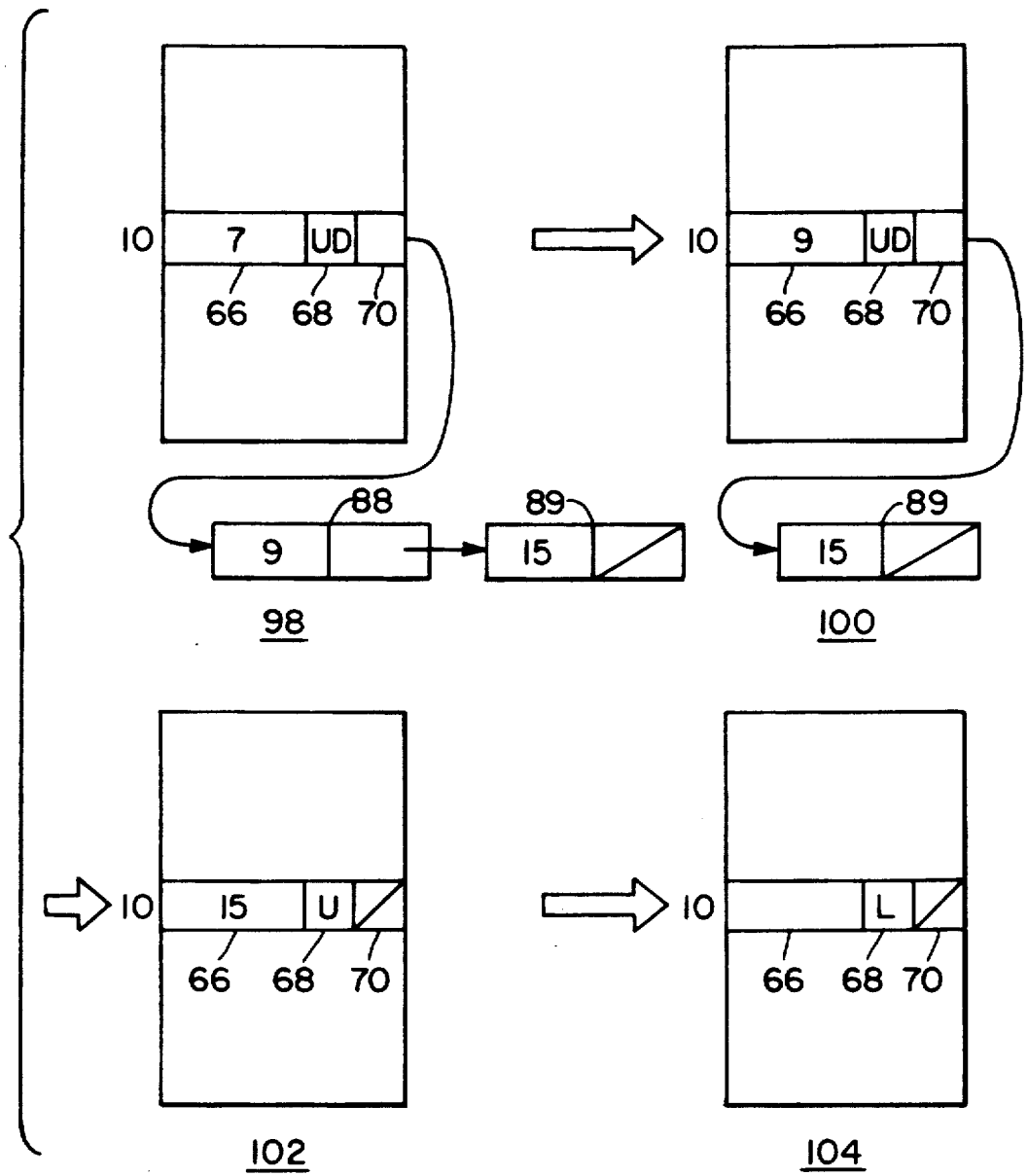
FIG. 8 illustrates a sample queueing operation performed using the enhanced locking strategy.

To further understand the relationship between the read lock command and write unlock command and to show the queueing capability provided by using a unlocked and deferred state, suppose that the tokens specified in FIG. 7a are executed resulting in memory state 98. Subsequently, the tokens specified in FIG. 6a are executed. FIG. 8 shows the memory states that occur for memory location 10. When token 60 is executed requesting a read/lock the value seven at the head of the deferred list is removed and sent to the address specified by Joe via a newly generated token. Executed token 62 changes the memory location so that the contents at address 10 are as shown in memory state 102. Meanwhile, the value nine is sent to the memory location at address Mary. The memory location 10 has the value fifteen in its value field 66, and it is set in an unlocked state as noted by the lock field 68. Moreover, the pointer field 70 is set at nil. Lastly, token 64 is executed, and the memory location contents at address 10 enter memory state 104. In memory state 104 the value field 66 has a don't care value, the lock field 68 is in a locked state and the pointer has a value of "nil". The value fifteen is sent to the memory location address Tom.

The present invention allows a memory access request to be made by a processing element without having to keep track of requests to memory and without having to send duplicate requests to memory, that is without busy-waiting. The requests are stored in a deferred list and are serviced at a later time. In the interim, the processing element may perform other tasks. Moreover, the present invention provides such synchronization efficiently. It stores locks atomically such that any access to data in a memory brings about access to the lock state. As such, two separate memory access transactions are not required. Furthermore, the correspondence of the lock to its piece of data is pre-established by their sharing of a memory address. No matching means, adjacency means, pointers or other means are required.

While the invention has been particularly shown and described with reference to preferred embodiments thereof, it will be understood by those skilled in the art that various changes in form and detail may be made without departing from the spirit and scope of the invention as defined in the appended claims. For instance, the present invention may be used with resources other than memory locations, and may be implemented in data processing architectures other than data flow machines.

We claim:

1. A data processing system, comprising:
   at least one processor element for generating access requests for a data processing memory of at least two access request types;
   a memory storing a data structure for implementing locking protocol for synchronization of access requests to memory comprising:
   a. a value field for holding values which can be accessed by an access request; and
   b. a lock field addressed with the value field that indicates whether the value field is locked; and
   a controller for controlling service of access requests to the memory and setting of the lock field in response to an access request of a first access request type, the controller, when the value field is locked, deferring access to the value field by an access request of the first access request type that locked the value field but unlocking the value field and servicing an access request of a second access request type.

2. The data processing system of claim 1 wherein the controller causes the value field to hold data in an unlocked state.

3. The data processing system of claim 1 wherein the controller causes the value field to hold a pointer that points to a list of access requests for a specific access request type when the value field is in a deferred state.

4. The data processing system of claim 1 wherein the controller places the lock field in a locked and deferred state that indicates to the controller than an locking type of access request currently has exclusive access to the value field and multiple request for exclusive access to the value field by access requests of the same locking type are pending which are stored on a deferred list of requests.

5. The data processing system of claim 1 wherein the controller places the lock field in an unlocked and deferred state that indicates to the controller than an unlocking type of access request currently has exclusive access to the value field and multiple request for exclusive access to the value field by access requests of the same locking type are pending which are stored on a deferred list of requests.

6. The data processing system of claim 4 wherein when the lock field is in the locked and deferred state, a pointer points to a deferred list of access requests of the locking type.

7. The data processing system of claim 5 wherein when the lock field is in the unlocked and deferred state, a pointer points to a deferred list of access requests of a locking type.

8. A data processing system, comprising:
   at least one processor element for generating memory access requests of at least two access request types:
   a memory storing a data structure for implementing locking protocol for synchronization of access by access requests to the memory comprising at a single memory address:
   a) a data field for holding values which can be accessed by an access request;
   b. a lock field that indicates whether the data field is locked; and
   c) a pointer field to point to lists of access requests for a specific access request type; and
   a controller for controlling service of access requests to the memory and setting of the lock field in response to an access request of a first access request type, the controller, when the data field is locked, deferring access to the data field by an access request of the first access request type that locked the data field but unlocking the value field and servicing an access request of a second access request type, the controller identifying a list of deferred access requests in the pointer field.

9. The data processing system of claim 8 wherein the controller places the lock field in a locked and deferred state that indicates to the controller that a locking type of access request currently has exclusive access to the data field and multiple requests for exclusive access to the data field by other access requests of the locking type are pending which are stored on a deferred list of requests.

10. The data processing system of claim 8 wherein the controller places the lock field in an unlocked and deferred state that indicates to the controller that an unlocking type of access request currently has exclusive access to the data field and that multiple requests for exclusive access to the data field by access requests of the same unlocking type are pending which are stored on a deferred list of requests.

11. The data processing system of claim 8 wherein the controller places the lock field in a locked and deferred state in which the pointer points to a deferred list of access requests of the locking type.

12. The data processing system of claim 8 wherein the controller places the lock field in an unlocked and deferred state in which the pointer points to a deferred list of access requests of the locking type.

13. A method of synchronizing access by a plurality of access requests generated in a data processing system to a data processing resource wherein the resource contains a lock field for indicating the current lock state of the resource, the method performed by a controller for controlling service of requested accesses and setting of lock states in the lock field comprising the steps of:
   a. the controller causing an access request to be serviced and setting the lock field of the resource to a locked state when the resource is requested by a first type of access request if the lock field is in an unlocked state;
   b. the controller causing an access request to be serviced and setting the lock field of the resource is requested by a second type of access request if the lock field is in a locked state; and p1 c. the controller deferring service of an access request and setting the lock field of the resource to a locked and deferred state when the resource is requested by the first type of access request if the lock field is in a locked state, and the controller then also adding the resource access request on to a deferred list of pending resource access requests of the first type.

14. A method as recited in claim 13 further comprising the step of:
   the controller deferring service of an access request and setting the lock field of the resource to an unlocked and deferred state when the resource is requested by the second type of resource access request if the lock field is in an unlocked state, and the controller then also adding the resource access request on to a deferred list of pending resource access requests of the second type.

15. A method as recited in claim 13 further comprising the step of:
   the controller deferring service of an access request and keeping the lock field of the resource in a locked and deferred state when the resource is requested by the first type of resource access request if the lock field is in a locked and deferred state, and the controller then also adding the resource access request on to the deferred list of pending resource access requests of the first type.

16. A method as recited in claim 14 further comprising the step of:
   the controller deferring service of an access request and keeping the lock field of the resource in an unlocked and deferred state when the resource is requested by the second type of resource access request if the lock field is in an unlocked and deferred state, and the controller then also adding the resource access request on to the deferred list of pending resource requests of the second type.

17. A method as recited in claim 13 further comprising the step of:
   the controller causing an access request to be serviced and keeping the lock field of the resource in a locked and deferred state when the resource is requested by the second type of resource access request if the lock field is in a locked and deferred state and other resource access request of the first type have been received yet are still outstanding and, the controller then also popping and servicing a pending resource access request off the deferred list of pending resource access requests of the first type.

18. A method as recited in claim 14 further comprising the step of:
   the controller causing an access request to be serviced and keeping the lock field of the resource to an unlocked and deferred state when the resource is requested by the second type of resource access request if the lock field is in an unlocked and deferred state and other resource access requests of the first type have been received yet are still outstanding and, the controller than also popping and servicing an pending resource access request off the deferred list of pending resource access requests from processes of the first type.

19. A method as recited in claim 13 further comprising the step of:
   the controller causing an access request to be serviced and setting the lock field of the resource to a locked state when the resource is requested by the second type of resource access request if the lock field is in a locked and deferred state and only one resource access request of the first type is outstanding and, the controller then also popping and servicing the last pending resource access request off the deferred list of pending resource access requests of the first type.

20. A method as recited in claim 14 further comprising the step of:
   the controller causing an access request to be serviced and setting the lock field of the resource to an unlocked state when the resource is requested by the first type of resource access request if the lock field is in an unlocked and deferred state and only one resource access request of the second type is outstanding and, the synchronizer then also popping and servicing the last pending resource access request off the deferred list of pending resource access requests of the second type.

21. A method as recited in claim 13 wherein the resource is a memory location.

22. A method as recited in claim 21 wherein the resource is an I-structure memory location.

23. A method of synchronizing access by a plurality of resource access requests generated in a data processing system to a data processing resource wherein the resource contains a lock field for indicating the current lock state of the resource, the method performed by a controller for controlling service of requested accesses and setting of lock states in the lock field comprising the steps of:

the controller causing an access request to be serviced and setting the lock field of the resource to a locked state when the resource is requested by a first type of resource access request if the lock field is in an unlocked state;

b. the controller causing service of an access request and setting the lock field of the resource to an unlocked state when the resource is requested by a second type of resource access request if the lock field is in a locked state; p1 c. the controller deferring service of an access request and setting the lock field of the resource to a locked and deferred state when the resource is requested by the first type of resource access request if the lock field is in a locked state, and the controller than also adding the resource access request on to a deferred list of pending resource access requests of the first type;

d. the controller deferring service of an access request and setting the lock field of the resource to an unlocked and deferred state when the resource is requested by the second type of resource access request if the lock field is in an unlocked state, and the controller then also adding the resource access request to a deferred list of pending resource access requests of the second type;

e. the controller deferring service of an access request and keeping the lock field of the resource in a locked and deferred state when the resource is requested by the first type of resource access request if the lock field is in a locked and deferred state, and the controller then also adding the resource access request to the deferred list of pending resource access requests of the first type;

f. the controller causing an access request to be serviced and keeping the lock field of the resource in an unlocked and deferred state when the resource is requested by the second type of resource access request if the lock field is in an unlocked and deferred state, and the controller then also adding the resource access request to the deferred list of pending resource access requests of the second type;

g. the controller causing an access request to be serviced and keeping the lock field of the resource in a locked and deferred state when the resource is requested by the second type of resource access request if the lock field is in an locked and deferred state and other requests for the resource from resource access request of the first type have been received yet are still outstanding and, the controller then also popping and servicing a pending resource access request off the deferred list of pending resource access requests of the first type;

h. the controller causing an access request to be serviced and keeping the lock field of the resource in an unlocked and deferred state when the resource is requested by the first type of resource access request if the lock field is in an unlocked and deferred state and other requests for the resource from resource access requests of the second type have been received yet are still outstanding and, the controller then also popping and servicing a pending resource access request off the deferred list of pending resource access requests of the second type;

i. the controller causing an access request to be serviced and setting the lock field of the resource to a locked state when the resource is requested by the second type of resource access request if the lock field is in a locked and deferred state and only one resource access request of the first type is outstanding and, the controller then also popping the last pending resource access request off the deferred list of pending resource access requests of the first type; and j. the controller causing an access request to be serviced and setting the lock field of the resource to a unlocked state when the resource is requested by the first type of resource access request if the lock field is in an unlocked and deferred state and only one resource access request of the second type is outstanding and, the controller then also popping and servicing the last pending resource access request off the deferred list of pending resource access requests of the second type.

24. A data processing system as recited in claim 1 wherein the data processing system is a data flow processing system.

25. A data processing system as recited in claim 1 wherein the data processing system is a tagged token data flow processing system.

26. A method as recited in claim 13 wherein the resource is a memory location, the first type of access request is a read request and the second type of access request is a write request.

* * * * *

UNITED STATES PATENT AND TRADEMARK OFFICE
CERTIFICATE OF CORRECTION

PATENT NO. : 5,263,161

DATED : November 16, 1993

INVENTOR(S) : Paul S. Barth, Richard M. Soley and Kenneth M. Steele

It is certified that error appears in the above-identified patent and that said Letters Patent is hereby corrected as shown below:

In Claim 1, column 10, line 6, change "locking" to --a locking--; in line 8, indent paragraph "a" and in line 10, indent paragraph "b."

In Claim 4, column 10, line 30, change "an locking" to --a locking--, and in line 32, change "multiple request" to --multiple requests--.

In Claim 5, column 10, line 42, change "locking type" to --unlocking type--.

In Claim 7, column 10, line 51, change "a locking" to --the locking--.

In Claim 13, column 11, line 44, change "resource is" to --resource to a locked stated when the resource is--, and in line 46, delete "p1" and start a new paragraph with "c."

In Claim 18, column 12, line 33, change "the resource to" to --the resource in--, and in line 39, change "controller than" to --controller then--.

UNITED STATES PATENT AND TRADEMARK OFFICE
CERTIFICATE OF CORRECTION

PATENT NO.   : 5,263,161
DATED        : November 16, 1993
INVENTOR(S)  : Paul S. Barth, Richard M. Soley and
               Kenneth M. Steele It is certified that error appears in the above-indentified patent and that said Letters Patent is hereby corrected as shown below:

In Claim 23, column 13, line 11, insert "a." before "the controller"; in line 20, delete "pl" and start a new paragraph with "c."; in line 25, change "than also" to --then also--; and in column 14, line 3, change "an locked" to --a locked--.

Signed and Sealed this

Fifth Day of July, 1994

Attest:

BRUCE LEHMAN

Attesting Officer

Commissioner of Patents and Trademarks